(12) United States Patent
Daniels et al.

(10) Patent No.: US 8,373,303 B1
(45) Date of Patent: Feb. 12, 2013

(54) SOLAR SYNCHRONIZED LOADS FOR PHOTOVOLTAIC SYSTEMS

(75) Inventors: Eric Daniels, Union Hall, VA (US); John Saussele, Davidson, NC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/560,726

(22) Filed: Jul. 27, 2012

Related U.S. Application Data

(63) Continuation of application No. 13/489,412, filed on Jun. 5, 2012.

(60) Provisional application No. 61/525,483, filed on Aug. 19, 2011.

(51) Int. Cl.
  *H02J 7/35* (2006.01)
  *H02J 3/00* (2006.01)
(52) U.S. Cl. ............................ 307/23; 307/82
(58) Field of Classification Search .................. 307/23, 307/82
  See application file for complete search history.

(56) References Cited

U.S. PATENT DOCUMENTS

| | | | |
|---|---|---|---|
| 7,126,294 B2 * | 10/2006 | Minami et al. | 318/139 |
| 8,108,081 B2 | 1/2012 | Lenox | |
| 2004/0159713 A1 | 8/2004 | Schmidt et al. | |
| 2010/0066168 A1 | 3/2010 | Gamliel | |
| 2010/0073969 A1 | 3/2010 | Rajagopalan et al. | |
| 2010/0263947 A1 | 10/2010 | Reichart et al. | |
| 2011/0089759 A1 | 4/2011 | Pan | |
| 2011/0121647 A1 | 5/2011 | Ragavanis | |
| 2011/0121648 A1 | 5/2011 | Pan | |
| 2011/0127841 A1 | 6/2011 | Chiang et al. | |

* cited by examiner

*Primary Examiner* — Hal Kaplan
(74) *Attorney, Agent, or Firm* — Taft Stettinius & Hollister LLP; Keith Swedo

(57) ABSTRACT

An electrical power supply arrangement includes a solar power device that converts sunlight into DC electrical power. A DC load runs on the DC current electrical power. The DC load may be controlled or adjusted to consume a maximum amount of the electrical output of the solar power device. A DC-to-AC converter converts the DC electrical power into AC electrical power. A controller enables the DC-to-AC converter to receive a portion of the DC current electrical power from the solar power device only if all of the DC current electrical power cannot be consumed by the DC load.

30 Claims, 6 Drawing Sheets

SOLAR SYNCHRONIZED LOADS FOR PHOTOVOLTAIC SYSTEMS

RELATED APPLICATIONS

This application is a continuation of, and claims the benefit of, nonprovisional application Ser. No. 13/489,412, filed Jun. 5, 2012, entitled "Solar Synchronized Loads for Photovoltaic Systems", by applicants Eric Daniels and John Saussele, and provisional application 61/525,483, filed Aug. 19, 2011, entitled "DC Power Bus for Solar Photovoltaics", by applicants Eric Daniels and John Saussele, each of which is hereby incorporated by reference herein in its entirety.

BACKGROUND OF THE INVENTION

1. Field of the Invention

The present invention relates to solar power, and, more particularly, to running DC loads by use of solar power.

2. Description of the Related Art

Current solar photovoltaic (PV) systems for residential and commercial buildings typically produce direct current (DC) which is inverted to alternating current (AC) using inverters in and connected to an AC circuit breaker box within or on the building. Such systems suffer from power intermittency caused when the grid must make up any short term reduction in PV output. Current HVAC systems such as heat pumps often utilize AC-to-DC-to-AC, AC motor controls or AC-to-DC power supplies especially when the fans or compressors have variable-speed motors. There are a variety of variable-speed motors which could utilize DC input. Examples are brushless DC motors (BLDC motors) also known as electronically commutated motors (ECM), as well as variable-frequency drives (VFD) for AC motors, which may also be configured to use DC as the input to the VFD. For example, a Bosch brand geothermal heat pump uses AC-to-DC power supply to power a variable speed ECM fan motor. For the purposes of this invention description, the phrase "DC motor" refers to any motor system where DC is the PV input to the motor or motor controls, even in the case of a DC input VFD controlling a variable speed AC motor or similar.

It is known to convert all of the DC from PV to AC for use by AC building loads or for export to the utility grid. What is not known in the conventional art is to adjust DC loads such that the DC loads consume a maximum amount of the DC electrical output of the solar panels, and to convert DC power from solar panels to AC only if all of the DC power is not being consumed by a DC load. Moreover, it is not known to purposefully manage loads, in a variable manner, on the demand side of the meter in concert with the variability of PV power for the purpose of reduction in or avoidance of power intermittency on the grid. Further, it is not known in the conventional art that the DC load is in the form of an HVAC system, such as a heat pump with DC input to the DC phase of AC-DC-AC motor controls.

SUMMARY OF THE INVENTION

The invention is directed to an HVAC power supply arrangement in which the DC output from a solar array is either directly or through DC/DC converters connected to the DC circuits of the HVAC equipment. The variable-speed DC motor may be controlled or adjusted to consume a maximum amount of the electrical output of the solar panels, increasing consumption when output is higher, lowering consumption when output is lower. An inverter that is either within (motor control circuits for instance) or separate from the HVAC equipment may operate in a bidirectional mode to invert the DC output from the solar array to AC for the home circuit if the output energy is not being entirely consumed by the variable-speed DC motor. This technique also enables the integration of a DC power bus within the home or commercial building for direct coupling to DC appliances and other DC devices.

In one embodiment, the invention comprises an electrical power supply arrangement including a solar power device that converts sunlight into DC electrical power. An adjustable DC load runs on the DC current electrical power. An electrical output sensing device senses a level of electrical output of the solar power device. A controller is coupled to each of the adjustable DC loads and the electrical output sensing device. The controller receives a signal from the electrical output sensing device, and adjusts the DC load such that the DC loads consumes substantially all of the electrical output of the solar power device. The adjusting of the DC loads is performed dependent upon the received signal, and depending on which other loads need to receive power. For example, it may be determined how much of the available solar-generated electricity should be sent to the HVAC systems and how much should be sent to other loads, such as a charging station for an Electric Vehicle (EV).

In another embodiment, the invention comprises an electrical power supply arrangement including a solar power device that converts sunlight into DC electrical power. A DC load runs on the DC current electrical power. A DC-to-AC converter converts the DC electrical power into AC electrical power. A controller enables the DC-to-AC converter to receive a portion of the DC current electrical power from the solar power device only if all of the DC current electrical power cannot be consumed by the DC load.

In yet another embodiment, the invention comprises an electrical power supply method including converting sunlight into DC electrical power by use of a solar power device. The DC current electrical power is provided to a plurality of adjustable DC loads. A level of electrical output of the solar power device is sensed. Each of the DC loads is adjusted such that the DC loads conjointly consume a maximum amount of the electrical output of the solar power device. The adjusting of the DC loads is dependent upon the level of electrical output of the solar power device.

In yet another embodiment, the invention comprises an electrical power supply method including converting sunlight into DC electrical power by use of a solar power device. The DC current electrical power is provided to an inverter to provide power to an AC load. A level of electrical output of the solar power device is sensed. The AC load or series of AC loads are operated in a variable fashion that optimizes the consumption of the variable PV DC electrical power in a manner which intends to eliminate or reduce AC power demands from the utility grid. The adjusting of the AC loads is dependent upon the level of electrical output of the solar power device.

The invention may eliminate the need to have an inverter between the photovoltaic (PV) system and the circuit breaker box. Instead, the DC output from the solar array may be either directly, or through DC/DC converters, connected to the DC circuits of the HVAC equipment. The inverter within the HVAC equipment then may act in a bidirectional mode to invert the DC from the solar array to AC for the home circuit or utility grid, if the output energy is not being entirely consumed by the variable-speed DC motor or other DC loads in the building. This technique also enables the integration of a DC power bus within the home or commercial building for direct coupling to DC appliances and other DC devices. The elimination of the traditional inverter conventionally used for solar systems may greatly reduce system cost, reduce electrical losses due to the inversion, and may result in increased system efficiency at lower cost. The invention may achieve the lower cost, higher efficiency, and higher reliability through simplification of the system.

In another embodiment, electrical DC loads (e.g., HVAC systems, appliances, EV chargers, water pumps, etc.) are adjusted in a variable manner such that the power consumption of the loads corresponds as closely as possible to the power available from a PV system. This adjustment of the DC loads is intended to result in less variation in the demand on other power sources in the system (e.g., the utility grid, battery, etc.) by the DC loads. In such applications, the PV output is designed to provide adequate power to the load without call for additional power from the utility or storage device. Utility or storage power is intended to only provide power during evenings or emergencies. This adjustment of the DC loads may also reduce system losses, minimize utility transformer size, lower system costs, and increase the ability of the utility grid to support higher penetration levels of renewable energy. Such application allows the utilities to avoid the added costs of spinning reserves for the purpose of managing the power intermittency caused by traditional PV system designs.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
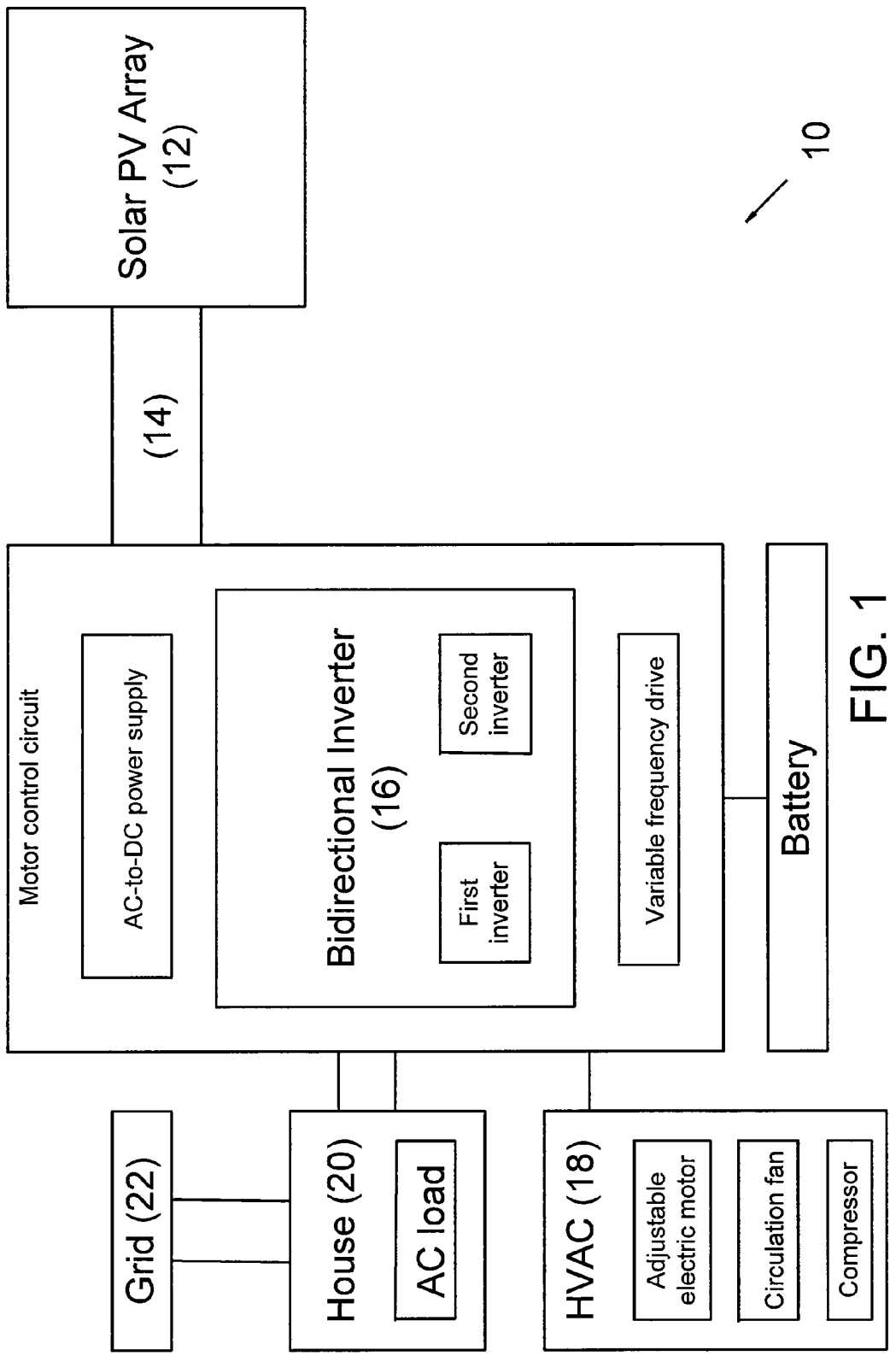
FIG. 1 is a block diagram of one embodiment of an electrical power supply arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is illustrated one embodiment of an electrical power supply arrangement 10 of the present invention including a solar PV array 12, and a DC power bus 14 electrically connecting array 12 to a bidirectional inverter 16 of an HVAC system 18 (or DC input to the DC phase in an AC-DC-AC motor controller circuit). Inverter 16 may convert DC voltage from array 12 to a DC voltage level that is appropriate for use by HVAC system 18. Array 12 may include a DC-to-DC converter which may convert the DC voltage output by the solar array to a voltage level suitable for transmission on bus 14. Inverter 16 may also convert DC voltage from array 12 to an AC voltage that may be used through the remainder of a house 20 with which arrangement 10 is associated. Excess AC power that cannot be used within house 20 may be provided to a grid 22 for use outside of house 20. In one embodiment, DC voltage from array 12 may be converted to AC voltage by inverter 16 only if HVAC system 18 (or other variable AC or DC loads) cannot consume all of the DC power from array 12.

By transferring the DC voltage from array 12 directly to HVAC system 18, arrangement 10 may eliminate the need for a separate inverter to convert the DC voltage from array 12 to AC voltage for transmission and use by both AC loads and DC loads (after conversion of the AC voltage back to DC voltage). The omission of the separate inverter may reduce electrical losses, reduce cost, and provide improved reliability of the system. Moreover, the invention may provide a high voltage DC power bus 14 which may be used by other appliances within the building or EV charging systems.

In another embodiment, the bidirectional inverter may simply be a DC drive or DC motor, and an optional, often smaller, inverter may be added to the DC bus. The need for an inverter and the size of the inverter may be determined by the amount of PV energy, if any, that could not be consumed by the DC loads under certain building circumstances.

In an alternative embodiment (not shown), the DC/DC conversion at PV array 12 is omitted. That is, the DC voltage may be transmitted on bus 14 in the same voltage as produced by the solar cells of array 12.

Figure 2:
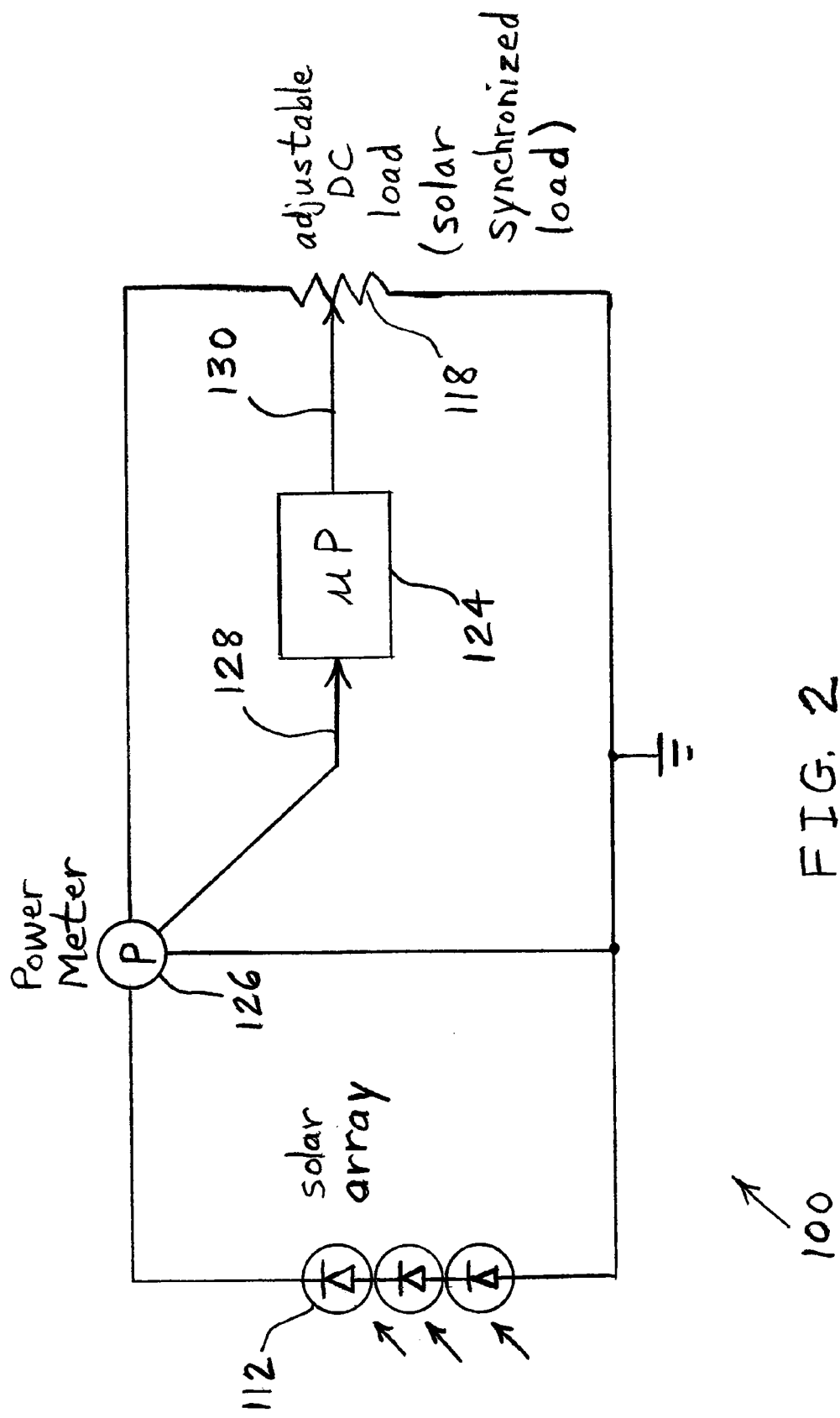
FIG. 2 is a block diagram of another embodiment of an electrical power supply arrangement of the present invention.

In another embodiment (FIG. 2), an electrical power supply arrangement 100 of the present invention includes a DC load 118 which can be adjusted by a controller 124 to maximize the use of a varying PV output of a solar array 112. That is, a power meter 126 or a similar device may sense the output power of solar array 112 and communicate the sensed reading to controller 124, as indicated at 128. In turn, controller 124 can adjust DC load 118, as indicated at 130, such that load 118 consumes substantially all of the power that solar array 112 can produce. Thus, no inverter, or a reduced size inverter, may be needed to feed excess PV output into the utility grid (not shown). A practical example would be to run air conditioning motors at lower speed for a longer time under the reduced solar power output of lower light (e.g., cloudy) conditions. This could achieve the same building cooling, while reducing the variation (intermittency) of power on the grid, which is highly desirable to the utility companies. Also, by the load(s) using the entire amount of electrical power produced by the solar array, the invention avoids the energy losses associated with converting the DC power from the solar array to AC power, transferring the AC power to the grid, receiving AC power from the grid, and converting the AC power from the grid to DC power.

The same principle may apply to systems utilizing battery storage in place of, or in addition to, solar arrays. In this case, the battery controller and/or charge controller could be reduced or eliminated by adjusting the load to consume all of the power output of the battery. In one embodiment, the battery ensures that a minimum required level of electrical power may be provided to the load when the solar array cannot provide the minimum required level of electrical power. For example, the battery may power the electronic controller as well as any electronics operating in association with the load. For example, a battery may keep lights operating on the load at night so that a user can interact with the load, even though the solar array cannot provide power to keep the load fully operating until daylight in the morning. The battery may be recharged by the solar array in the event that the solar array produces more power than is required by the load. In addition, synchronizing the loads to the available solar energy could reduce the amount and frequency of charging and discharging batteries in the system which may extend the battery life. Solar Synchronized Loads can also improve battery life by reducing the intermittency in battery charging/discharging in the same way as intermittency in utility grid demand is reduced.

Figure 3:
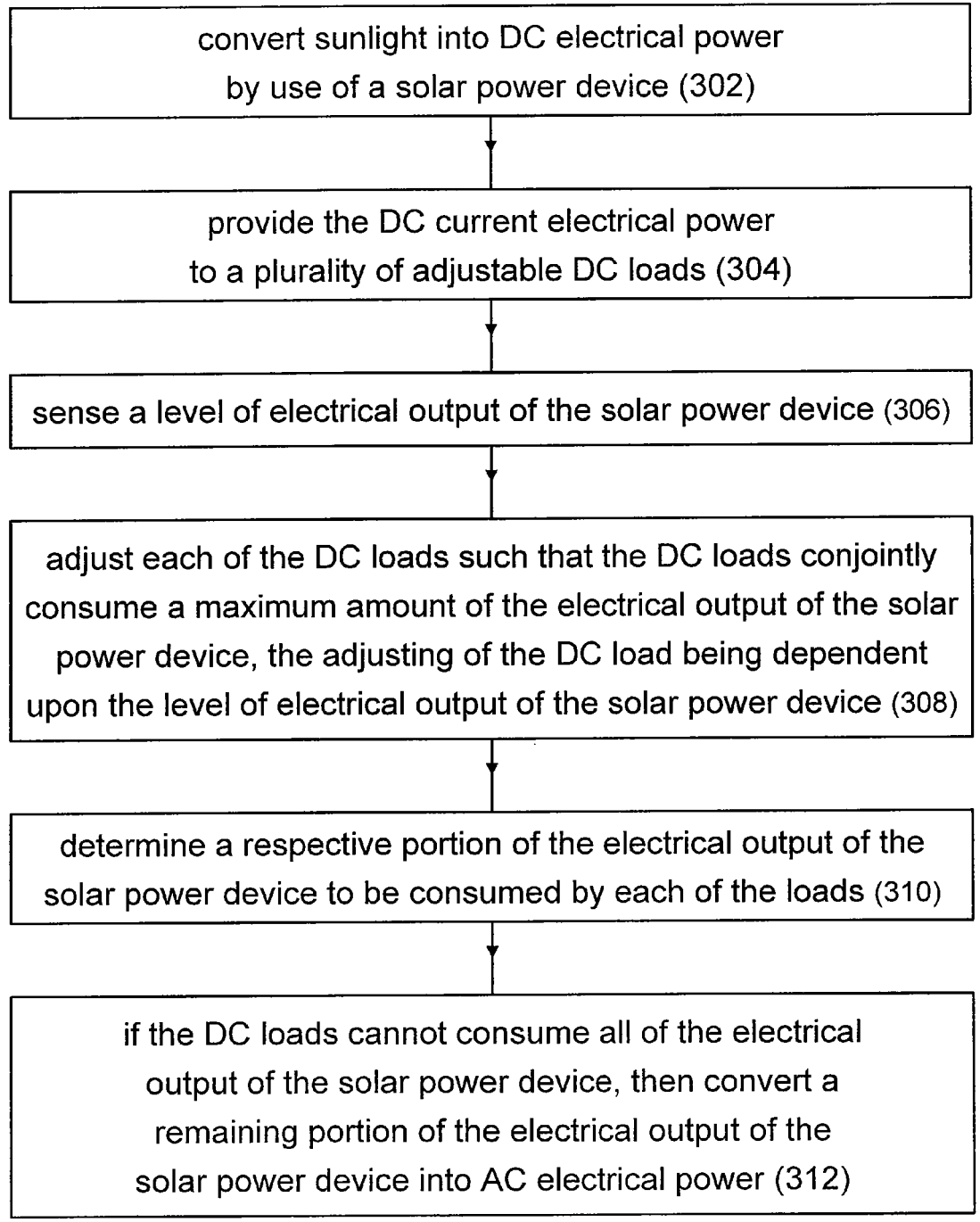
FIG. 3 is a flow chart of one embodiment of an electrical power supply method of the present invention.
Figure 4:
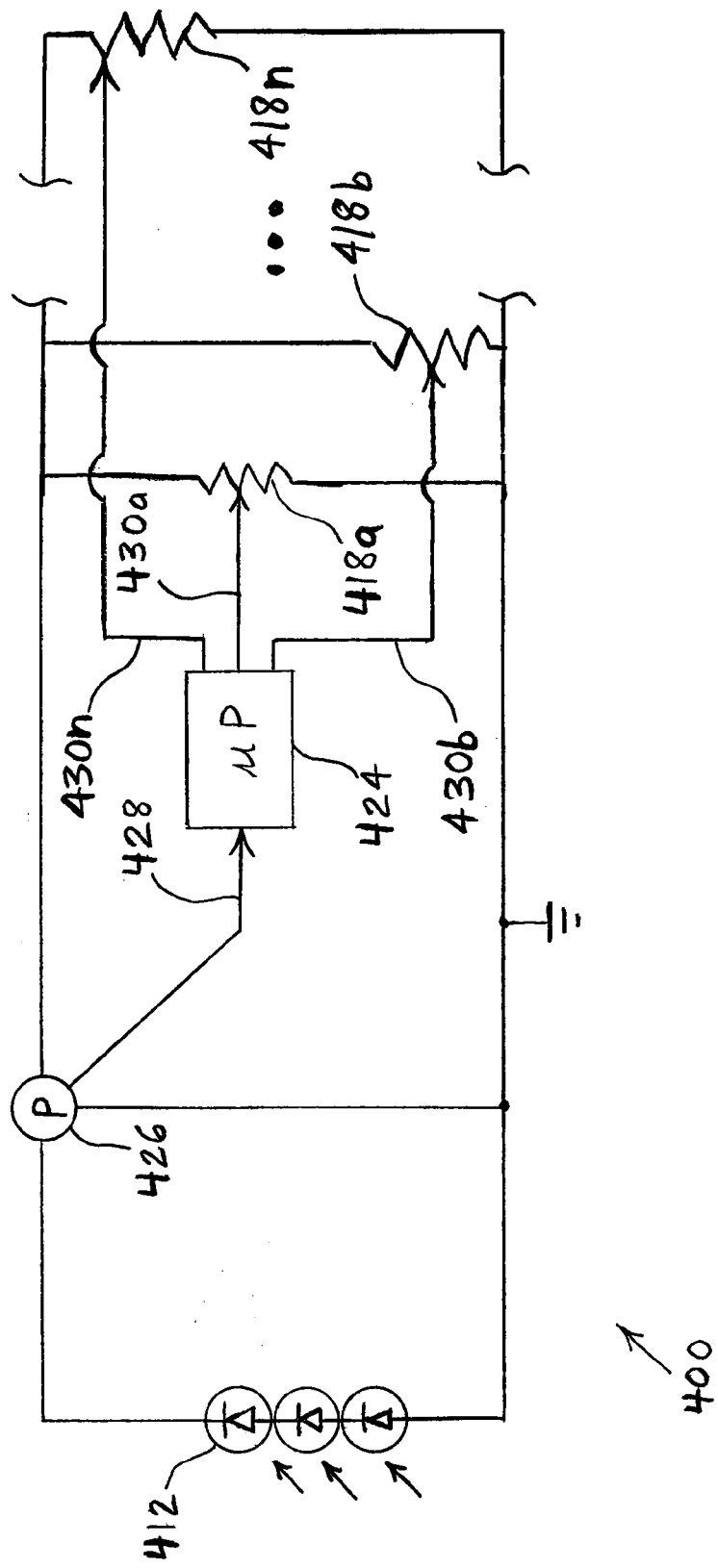
FIG. 4 is a block diagram of yet another embodiment of an electrical power supply arrangement of the present invention.
Figure 5:
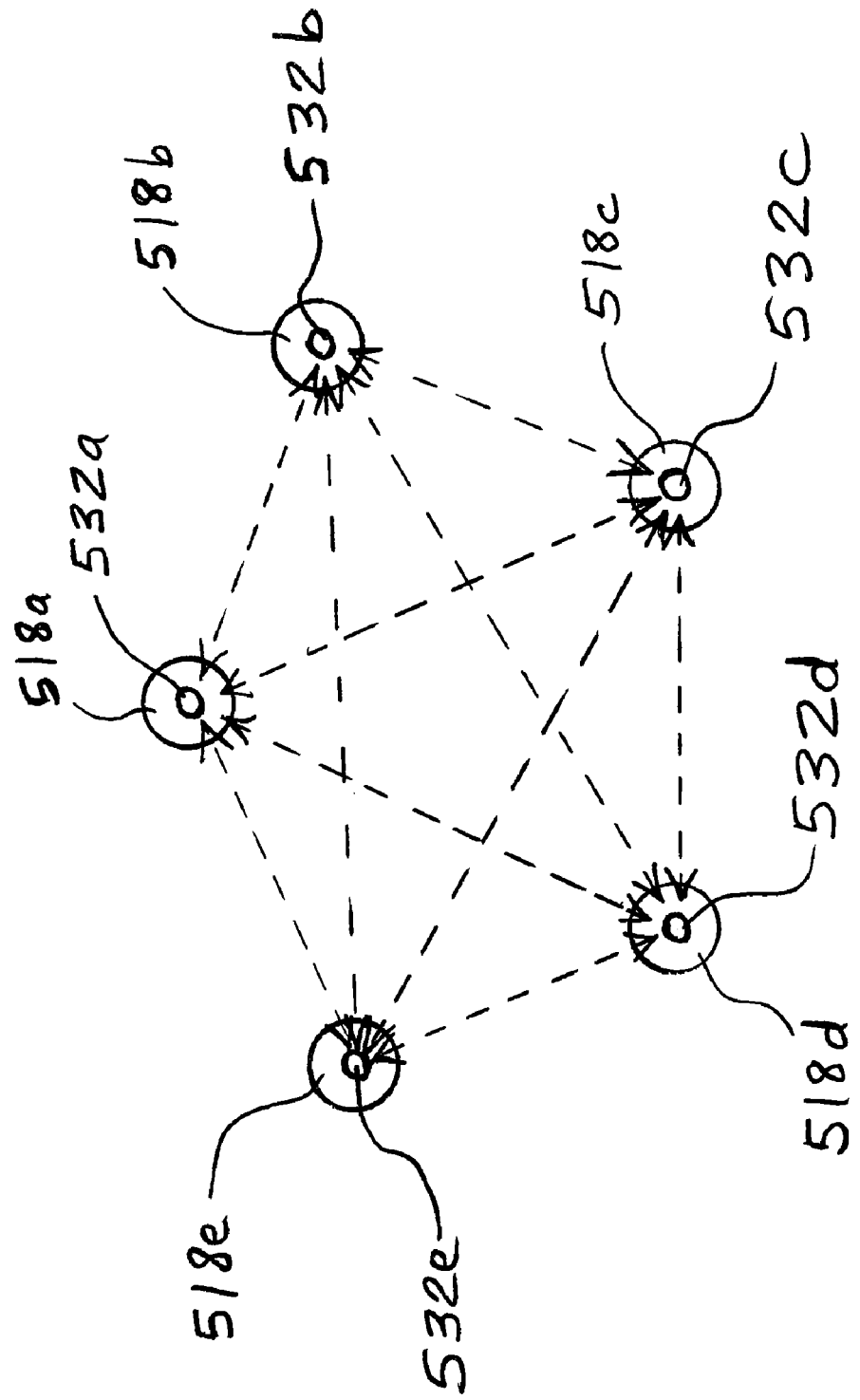
FIG. 5 is a diagram illustrating communication between DC loads according to another embodiment of an electrical power supply method of the present invention.

An electrical power supply method 300 (FIG. 3) of the invention is described below with reference to FIGS. 4 and 5. In a first step 302, sunlight is converted into DC electrical power by use of a solar power device. For example, electrical power supply arrangement 400 (FIG. 4) includes a solar array 412 which converts sunlight into DC electrical power.

In a next step 304, the DC current electrical power is provided to a plurality of adjustable DC loads. As shown in the specific embodiment of FIG. 4, a plurality of DC loads 418a through 418n each receives and runs on the DC current electrical power generated by solar array 412. Alternatively, DC loads 418 may be AC loads.

Next, in step 306, a level of electrical output of the solar power device is sensed. For example, a power meter 426 or a similar device may sense the output power of solar array 412 and communicate the sensed reading to controller 424, as indicated at 428.

In step 308, each of the DC loads is adjusted such that the DC loads conjointly consume a maximum amount of the electrical output of the solar power device. The adjusting of the DC loads is dependent upon the level of electrical output of the solar power device. In the example embodiment of FIG. 4, controller 424 can adjust each of DC loads 418a-n, as indicated at 430a-n, such that loads 418a-n in combination consume substantially all of the power that solar array 412 can produce. Thus, no inverter, or a reduced size inverter, may be needed to feed excess PV output into the utility grid (not shown). For example, loads 418a-n may represent n number of air conditioning motors each of which is primarily responsible for cooling a respective section of a building. In an alternative embodiment, loads 418a-n may represent n number of refrigeration and/or ice-making motors. Although the various sections of the building may be at or below the desired set temperature (e.g., 72 degrees F.), AC motors 418a-n may continue to run during and around the noon hour when sunlight is most direct and thus the output of solar array 412 is greatest. Thereby, the various sections of the building may be "overcooled" to a temperature of approximately between 68 and 71 degrees F., for example. By virtue of such overcooling, AC motors 418a-n may require less electrical power output from solar array 412 in the late afternoon when sunlight is less direct and the electrical power output capability of solar array 412 is lower. Thus, the building may be efficiently cooled with only small variations in temperature which may not be noticeable to the inhabitants of the building. Also, the variation in the amount of power require from the grid may be reduced, which is highly desirable to the utility companies. Further, by the loads using the full amount of electrical power produced by the solar array, the invention avoids the energy losses associated with converting the DC power from the solar array to AC power, transferring the AC power to the grid, receiving AC power from the grid, and converting the AC power from the grid to DC power.

In a next step 310, a respective portion of the electrical output of the solar power device to be consumed by each of the loads is determined, possibly by use of an algorithm or a lookup table. For example, if DC loads 418a-n represent n number of air conditioning motors cooling respective sections of a building, then each of the sections of the building may be at different actual temperatures, and possibly may have different set temperatures. Thus, controller 424 may adjust air conditioning (or cooling equipment) motors 418a-n such that each motor consumes an amount or portion of electrical power that varies with the difference between the actual temperature and the set temperature of the motor's respective building section. The algorithm or lookup table may take into account expected thermal conditions in each of the building sections in the immediate future (e.g., in the next three hours). For example, a section on the west side of the building that is more exposed to sunlight may be expected to heat up more in the next few afternoon hours, and thus the respective air conditioning motor may be adjusted to consume a greater portion of the electrical power output of solar array 412. Generally, the HVAC equipment may no longer operate in a digital fashion as in all on or all off. Instead, the compressor and blower unit may operate at levels consistent with the output of the solar array. When the sun shines strongest, heat loads tend to be highest. The same principle applies to ice-making and refrigeration.

The step 310 of determining a respective portion of the electrical output of the solar power device to be consumed by each of the loads may include controlling a rate of change of an aggregate consumption of the electrical output of the solar power device by the loads such that the rate of change does not exceed a threshold rate of change. Thus, the amount of power drawn from solar array 412 may change with a gradual ramp up in order to avoid spikes of power being sent to and/or from the grid. Such spikes may result in inefficiencies and wasted energy. For example, controller 424 may adjust loads 418a-n such that a rate of change of power consumption by loads 418a-n does not exceed a threshold or maximum level of Watts per second of time. If the load requires more energy than can be delivered from the array, a signal may be sent to the utility advising that the load is planning a gradual ramp and an increased power call from the utility. The timing of the ramp may be adjustable based upon a feedback loop (power availability) from the utility.

Each of the loads may include a respective processor, and the step of determining a respective portion of the electrical output of the solar power device to be consumed by each of the loads may include communication between the processors. For example, as shown in FIG. 5, loads 518a-e each includes a respective one of processors 532a-e. Each of processors 532a-e may communicate directly with each of the other ones of processors 532a-e, as indicated by the dashed double-sided arrows in FIG. 5. The communication between processors 532a-e may occur wirelessly, or may be carried by same the electrical conductors that carry power to loads 518a-e. In one embodiment, processors 532a-e communicate with each other in order to conjunctively determine how much power will be drawn by each of loads 518a-e. For example, processors 532a-e may conjunctively determine how much power will be drawn by each of loads 518a-e such that all of the power produced by the solar array is consumed. Alternatively, or in addition, processors 532a-e may conjunctively determine how much power will be drawn by each of loads 518a-e such that a rate of change of power consumption by loads 518a-e does not exceed a threshold or maximum level of Watts per second of time.

In a final step 312 (FIG. 3), if the DC loads cannot consume all of the electrical output of the solar power device, then a remaining portion of the electrical output of the solar power device is converted into AC electrical power. There may also be situations in which the load 418a-n are capable, strictly speaking, of consuming all of the electrical output of the solar power device 412, but processor 424 does not allow one or more the loads 418a-n to consume all the power they are capable of consuming in order to avoid damaging or overheating loads 418a-n. In the above-described embodiment including loads in the form of air conditioning motors, processor 424 may not allow one or more the motor to consume all the power they are capable of consuming in order to avoid burning out the motors. Regardless of whether the loads are physically incapable of consuming all of the electrical output of the solar power device or the processor prevents the loads from consuming all of the electrical output of the solar power device strictly to avoid damaging the loads, the remaining portion of the electrical output of solar array 412 may be converted in AC electrical power. This AC electrical power may then be consumed by AC appliances within the building, consumed by full home, commercial building loads, or sent to the grid for use by other consumers.

Other features of electrical power supply arrangement 400 may be substantially similar to those of electrical power supply arrangement 100 as described above, and thus are not further described herein in order to avoid needless repetition.

Figure 6:
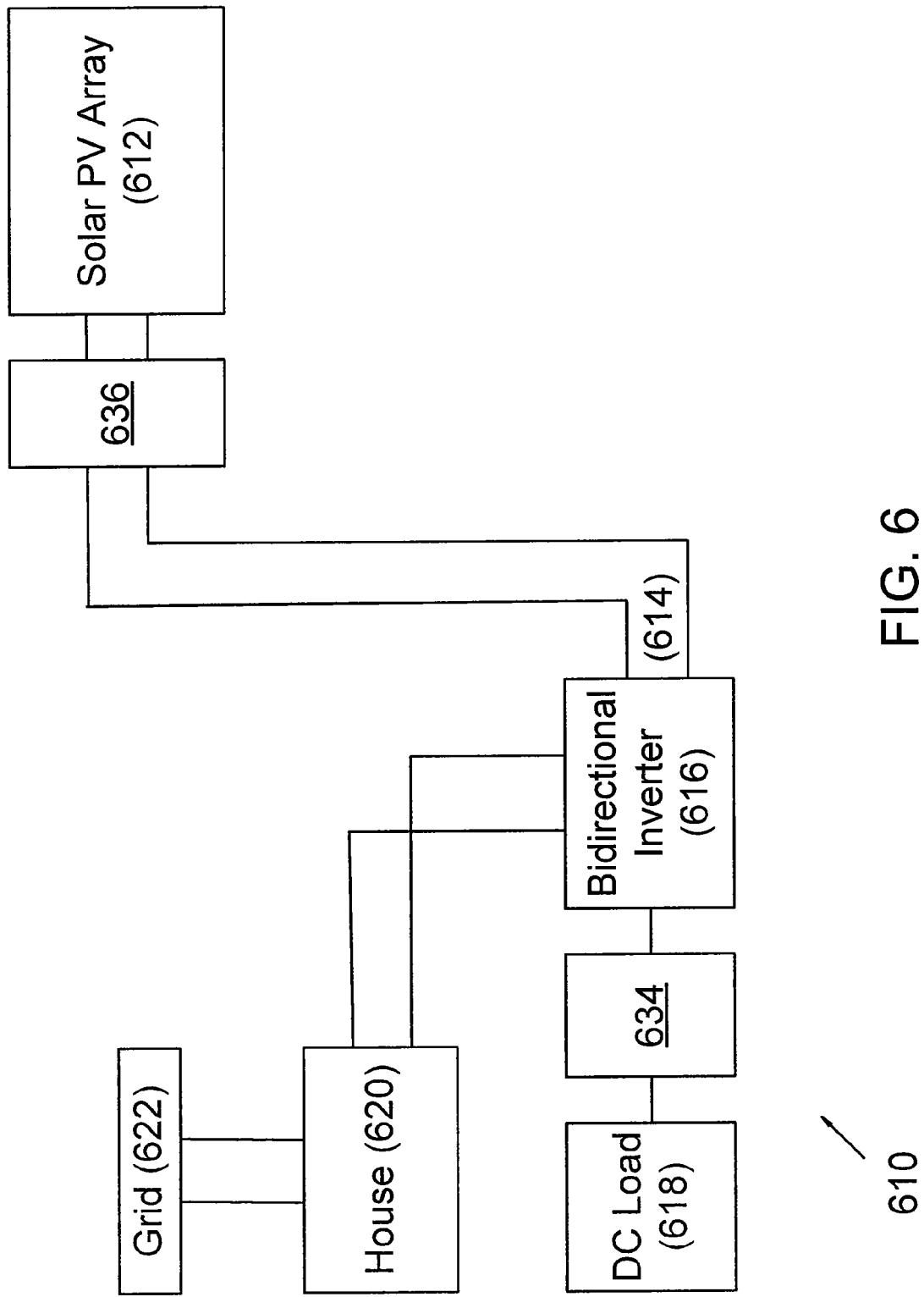
FIG. 6 is a block diagram of still another embodiment of an electrical power supply arrangement of the present invention.

In FIG. 6 there is illustrated still another embodiment of an electrical power supply arrangement 610 of the present invention including a solar PV array 612, and a DC power bus 614 electrically connecting array 612 to a bidirectional inverter 616 associated with a DC load 618. Inverter 616 may convert DC voltage from array 612 to a DC voltage level that is appropriate for use by DC load 618. A uni-directional (e.g., one-way) power connector 634 may couple DC load 618 to inverter 616. Connector 634 may allow current to flow in only one direction (e.g., from inverter 616 to load 618), and may prevent current from flowing from load 618 to inverter 616 if load 618 happens to function as a generator for a brief period. In one embodiment, connector 634 may be in the form of one or more diodes (not shown). Thus, uni-directional connector 634 may prevent power from load 618 from damaging inverter 616.

Array 612 may include a DC-to-DC converter which may convert the DC voltage output by the solar array to a voltage level suitable for transmission on bus 614. Inverter 616 may also convert DC voltage from array 612 to an AC voltage that may be used through the remainder of a house 620 with which arrangement 610 is associated. Excess AC power that cannot be used within house 620 may be provided to a grid 622 for use outside of house 620. In one embodiment, DC voltage from array 612 may be converted to AC voltage by inverter 616 only if HVAC system 618 (or other variable AC or DC loads) cannot consume all of the DC power from array 612. A uni-directional (e.g., one-way) power connector 636 may couple array 612 to inverter 616. Connector 636 may allow current to flow in only one direction (e.g., from array 612 to inverter 616), and may prevent current from flowing from inverter 616 to array 612. In one embodiment, connector 636 may be in the form of one or more diodes (not shown). Thus, uni-directional connector 636 may prevent power from inverter 616 from damaging electronics associated with array 612.

As the invention may be applied to an HVAC system as the load, if heating or cooling is not needed while the PV electrical output is available, the circulation fan could still run to provide air filtering functionality. Similarly, the compressor could run in a dehumidification mode. Buildings can also be "overcooled" or "overheated" by a slight amount, reducing future energy demand. Thus, by use of these techniques, all of the electrical power produced by the PV may be consumed by the HVAC system.

As the invention may be applied to a freezer or refrigerator as the load, the motor speed of the freezer's compressor could be varied to match or completely consume the PV electrical output. Any excess electrical output could be used to "overcool", or further lower, the freezer temperature beyond the temperature that would ordinarily be called for. This allows the thermal energy stored in the freezer to be recovered at night (when there may be no PV electrical output), thereby enabling the freezer to draw a lower level of electrical power from other sources.

As the invention may be applied to a heat pump or conventional electric hot water heater as the load, the load can be adjusted to match or completely consume the PV electrical output. Any excess PV electrical output may be used to "overheat" the water above the temperature that would ordinarily be called for. Thus, the need to draw power from other non-PV sources during the day or at night is reduced.

As the invention may be applied to a water pump as the load, the pump could be run at variable speed to match or completely consume the PV output. Any extra water that is pumped at a higher motor speed may be stored or deployed during the daytime, thereby reducing the nighttime needs for pumping water.

As the invention may be applied to electric vehicle charging as the load, the battery charge rate can vary with PV electrical output. A DC power bus between the PV system and the DC motor loads may provide an efficient way to vary the load. PV modules output DC voltage, so utilizing the DC voltage directly via the DC power bus without conversion to AC voltage may reduce conversion losses.

In one embodiment, a DC input Variable Frequency Drive (VFD) for an AC motor or DC brushless motor provides an efficient way to vary the speed of a motor and thereby vary the load to match the PV electrical output. The DC input Variable Frequency Drive may be employed to vary the amount of work done instead of the conventionally-used on/off cycle or duty cycle. A DC input Variable Frequency Drive may be employed in an HVAC system, an irrigation water pump, or a refrigerator, for example.

In one embodiment, the application is applied to HVAC systems on commercial rooftops. Wiring costs and electrical losses may be reduced by directly feeding the PV power into the HVAC rooftop compressor or air handling unit. Losses may be further reduced by utilizing a DC bus to a DC motor.

The principle of solar synchronized DC loads may be applied to standardized DC building bus systems (e.g., the emerging 380VDC standard). In one embodiment, PV modules may contain DC/DC converters, with the known inherent benefits of ease of application, flexibility to modify the system to accommodate rooftop changes, tolerance to shadowing, etc. Various building electrical loads may be developed to operate off a standardized voltage (e.g. 380VDC), and all loads may be synchronized to PV output via central control to minimize variation in grid demand.

The invention may beneficially influence electricity consumption via a smart grid. For example, the peak power load and the peak power generation by the utility company may be reduced by the invention.

In another aspect, the invention may realize system synergies. For example, the invention may enable the coordination of run times, prevent overloading, and enable the scheduling of events based on the current weather or forecast (e.g., the amount of cloud cover).

In another aspect, the communication between the solar array and the loads, and the potential communication between the various loads enabled by the invention may enable the homeowner/user/operator to locally and remotely control the user interface. For example, the user may control the user interface from his couch within the building, from his work place remotely, or from his vacation home remotely. This local and/or remote user control may include reviewing performance data, scheduling operation of appliances based on power cost rates, reviewing billing, and optimizing operation.

In another aspect, the invention may include features utilized by a professional appliance installer. For example, the installer may be provided with an interface for remotely servicing, diagnosing, and/or troubleshooting. This interface may eliminate the need for the installer to make a trip to the job site for troubleshooting. The interface may also enable the installer to offer system optimization as a service.

In still another aspect, the invention may enable an appliance manufacturer to optimize the appliance or system remotely. The appliance manufacturer may also remotely diagnose the appliance or system to thereby assist the installer. The invention may also enable the appliance manufacturer to monitor the performance of the appliance or system, as well as monitor the appliance or system on a long-term basis.

In a further aspect, the invention may provide a central user interface in the form of an existing device that is already familiar to the user, such as an iPhone, television or laptop computer. By using a familiar interface, the number of questions from the user is reduced, the number of errors made by the user is reduced, and the user is enabled to have an intuitive interaction with the appliance.

In a still further aspect, the invention may operate with a universal open source protocol, such as Zigbee, WLAN, etc. Thus, interaction with other devices may be enabled.

In another aspect of the invention, there may be a gateway with firewall in each appliance or device. Thus, a high level of operational security may be provided.

In yet another aspect, the invention may be integrated in a home network. Such home networks may include the Google power meter or Apple Apps, and/or may be marketed by the Microsoft HomeStore.

In a further aspect, the invention may include a parallel DC network to eliminate DC-to-AC conversion or AC-to-DC conversion. Thus significant losses caused by such conversions may be eliminated.

The invention has been described in some embodiments above as applying to an HVAC system. However, in other embodiments, the invention is applied to domestic hot water (DHW), building access control/alarm systems/security systems/fire alarms, automobile charging (electric vehicle/plug-in hybrid electric vehicle), kitchen appliances, media, internet, etc.

The invention has been described above as applying to a DC power source in the form of a solar array. However, in other embodiments, the invention is applied to other sources of DC power, such as the rectified output of a wind turbine, for example. The invention may be applied to any DC power source, but may be particularly applicable to a DC power source whose level of DC power output fluctuates with time.

In another embodiment, a bidirectional inverter, similar to bidirectional inverter 16 in FIG. 1, includes a DC solar variable frequency drive (VFD) optimizer. This embodiment may be advantageous with an electric vehicle charger or DC LED lighting being powered on the bus between the solar PV array and the DC VFD optimizer. The solar VFD optimizer may remove the need for a solar inverter and may minimize AC cycling on the utility supply (e.g., demand smoothing).

With a variable frequency drive used in conjunction with an HVAC, the speed of rotation may be driven by solar radiation. Also, there may be longer cycles if necessary to offset slower compressor rotation. Further, this variable frequency drive to HVAC embodiment may seek constant draw from the utility as opposed to ON/OFF cycling.

The solar variable frequency drive (VFD) optimizer may enable post-installation changes to the solar configuration, and may enable the use of a high voltage DC power bus, such as could be used with LED lighting and/or EV changing as mentioned above. Also, the solar variable frequency drive (VFD) optimizer embodiment may apply to refrigeration, pumping, etc.

While this invention has been described as having an exemplary design, the present invention may be further modified within the spirit and scope of this disclosure. This application is therefore intended to cover any variations, uses, or adaptations of the invention using its general principles.

What is claimed is:

1. An electrical power supply arrangement comprising:
a solar power device configured to convert sunlight into DC electrical power;
at least one adjustable DC load configured to run on the DC current electrical power;
an electrical output sensing device configured to sense a level of electrical output of the solar power device; and
a controller coupled to each of the at least one adjustable DC load and the electrical output sensing device, the controller being configured to:
receive a signal from the electrical output sensing device;
adjust the at least one adjustable DC load such that the at least one adjustable DC load consumes a maximum amount of the electrical output of the solar power device, the adjusting of the at least one adjustable DC load being dependent upon the received signal; and
if the at least one adjustable DC load cannot consume all of the electrical output of the solar power device, then cause a remaining portion of the electrical output of the solar power device to be converted into AC electrical power.

2. The arrangement of claim 1 wherein the solar power device comprises a solar photovoltaic device.

3. The arrangement of claim 1 wherein the electrical output sensing device comprises a power meter.

4. The arrangement of claim 1 wherein the adjustable DC load comprises an HVAC system.

5. The arrangement of claim 4 wherein the HVAC system comprises a circulation fan, the controller being configured to use power from the solar power device to operate the circulation fan while heating and cooling is not needed.

6. The arrangement of claim 4 wherein the HVAC system comprises a compressor, the controller being configured to use power from the solar power device to operate the compressor in a dehumidification mode while heating and cooling is not needed.

7. The arrangement of claim 4 wherein the controller is configured to use power from the solar power device to perform overheating or overcooling with the HVAC system beyond a set temperature of the HVAC system, the set temperature having been set by a human user.

8. The arrangement of claim 1 further comprising a battery configured to supplement the DC electrical power provided by the solar power device.

9. An electrical power supply method, comprising the steps of:
converting sunlight into DC electrical power by use of a solar power device;
providing the DC current electrical power to a plurality of adjustable DC loads;
sensing a level of electrical output of the solar power device; and adjusting each of the DC loads such that the DC loads conjointly consume a maximum amount of the electrical output of the solar power device, the adjusting of the DC loads being dependent upon the level of electrical output of the solar power device.

10. The method of claim 9 comprising the further step, if the DC loads cannot consume all of the electrical output of the solar power device, of converting a remaining portion of the electrical output of the solar power device into AC electrical power.

11. The method of claim 9 comprising the further step of determining a respective portion of the electrical output of the solar power device to be consumed by each of the loads.

12. The method of claim 11 wherein the determining step is performed by use of an algorithm or a lookup table.

13. The method of claim 11 wherein the determining step includes controlling a rate of change of an aggregate consumption of the electrical output of the solar power device by the loads such that the rate of change does not exceed a threshold rate of change.

14. The method of claim 11 wherein each of the loads includes a processor, the determining step including the processors of the loads communicating with each other.

15. An electrical power supply arrangement comprising:
a solar power device configured to convert sunlight into DC electrical power;
a DC load configured to run on the DC current electrical power;
a DC-to-AC converter configured to convert the DC electrical power into AC electrical power; and
a controller configured to enable the DC-to-AC converter to receive a portion of the DC current electrical power from the solar power device only if all of the DC current electrical power cannot be consumed by the DC load.

16. The arrangement of claim 15 further comprising an AC-to-DC power supply configured to supply DC electrical power to the DC load if sunlight is not available to the solar power device.

17. The arrangement of claim 15 further comprising a DC power bus interconnecting the solar power device and the DC load.

18. The arrangement of claim 15 wherein the DC load comprises an appliance.

19. The arrangement of claim 18 wherein the appliance comprises HVAC equipment.

20. An electrical power supply arrangement comprising:
A first AC load configured to run on AC electrical power;
a solar power device configured to convert sunlight into DC electrical power;
an adjustable electric motor powered by the DC electrical power; and
a motor control circuit coupling the solar power device to the adjustable electric motor and to the first AC load, the motor control circuit being configured to control operation of the adjustable electric motor, the motor control circuit including a first inverter configured to invert the DC electrical power into AC electrical power for the first AC load only if the adjustable electrical motor is unable to entirely consume the DC electrical power.

21. The arrangement of claim 20, wherein the first AC load receives power only through the motor control circuit.

22. The arrangement of claim 20, wherein the motor control circuit further couples the solar power device to a DC load separate from the electric motor.

23. The arrangement of claim 20, wherein the motor control circuit further includes an inverter coupling the solar power device to a DC load, the inverter being configured to convert a first voltage of the DC electrical power provided by the solar power device to a second voltage suitable for powering the DC load.

24. The arrangement of claim 20, wherein the motor control circuit further includes a second inverter configured to invert the DC electrical power into AC electrical power for a second AC load only if the adjustable electric motor and the first AC load together are unable to entirely consume the DC electrical power.

25. The arrangement of claim 20, wherein the motor control circuit further couples the solar power device to a battery configured to supplement the DC electrical power provided by the solar power device.

26. The arrangement of claim 20, wherein the adjustable electric motor drives at least one of an HVAC compressor and an HVAC circulation fan.

27. The arrangement of claim 20, wherein the adjustable electric motor is a DC motor.

28. The arrangement of claim 20 wherein the motor control circuit includes a Variable Frequency Drive including a DC input, the Variable Frequency Drive being configured to vary a speed of the electric motor such that the electric motor consumes a maximum amount of the electrical output of the solar power device.

29. The arrangement of claim 20 wherein the motor control circuit is directly connected to the solar power device.

30. The arrangement of claim 20 further comprising an electrical output sensing device coupled to the motor control circuit and configured to sense a level of electrical output of the solar power device, the motor control circuit being configured to:
receive a signal from the electrical output sensing device;
adjust operation of the adjustable electrical motor such that the adjustable electrical motor consumes a maximum amount of the electrical output of the solar power device, the adjusting of the adjustable electrical motor being dependent upon the received signal; and
if the adjustable electrical motor cannot consume all of the electrical output of the solar power device, then cause a remaining portion of the electrical output of the solar power device to be converted into AC electrical power.

* * * * *